April 16, 1929.  W. H. PEACEY  1,709,036
ROTARY VALVE FOR FLUID PRESSURE ENGINES
Filed March 5, 1927   2 Sheets-Sheet 1

William Howell Peacey
Inventor
his Attorney

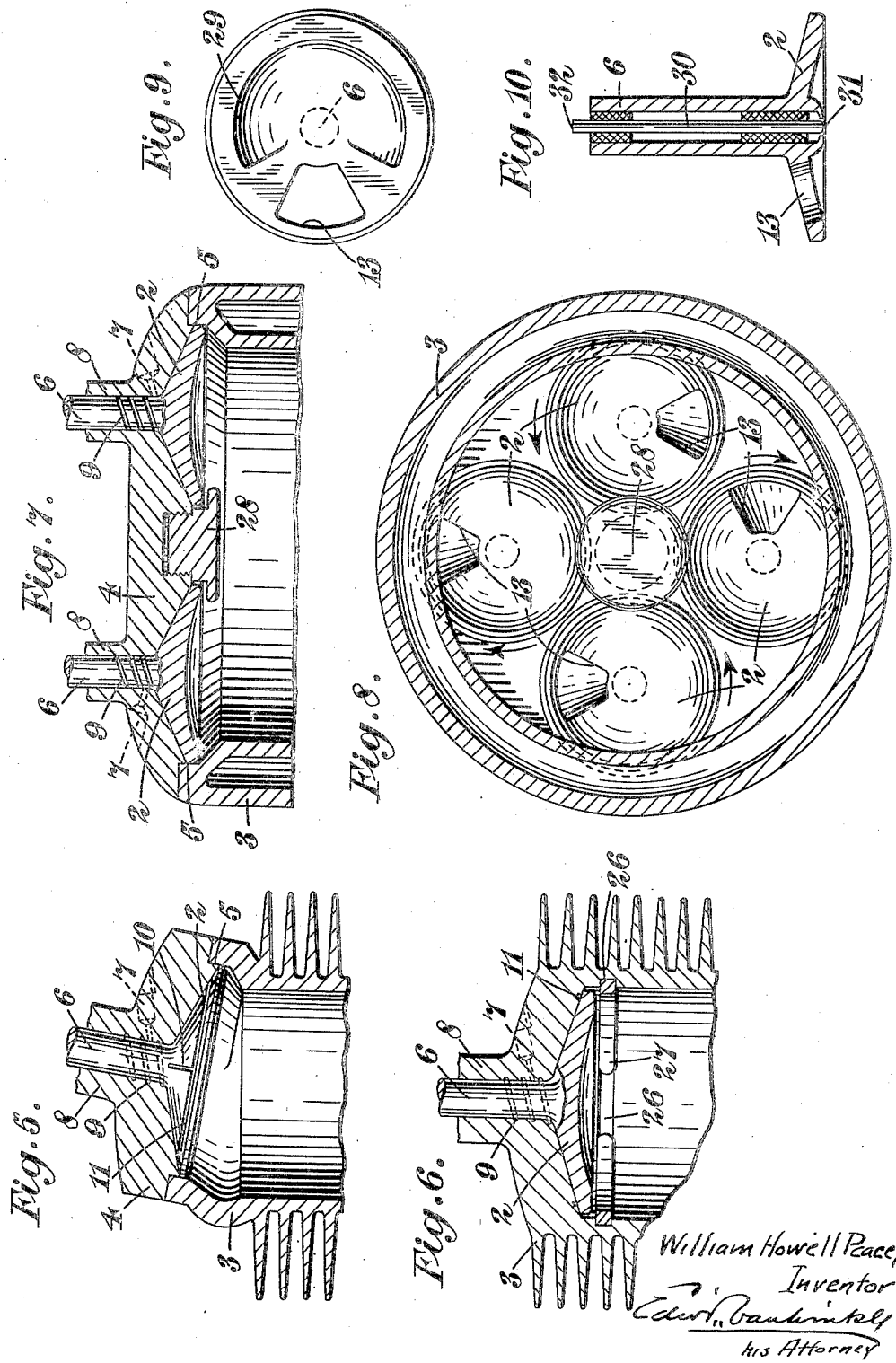

Patented Apr. 16, 1929.

1,709,036

UNITED STATES PATENT OFFICE.

WILLIAM HOWELL PEACEY, OF CHELTENHAM, ENGLAND.

ROTARY VALVE FOR FLUID-PRESSURE ENGINES.

Application filed March 5, 1927, Serial No. 173,103, and in Great Britain March 5, 1926.

This invention relates to rotary valves for fluid pressure engines, of the kind comprising a revolving ported disc engaging the dome of the cylinder and co-operating with inlet and exhaust ports therein, and its principal objects are to provide an improved method of lubricating the working surfaces, whilst avoiding ignition troubles through excess lubricant, and of mounting the valve so that no spring or other thrust device is required to hold it pressure-tight on its seat.

Figure 1:
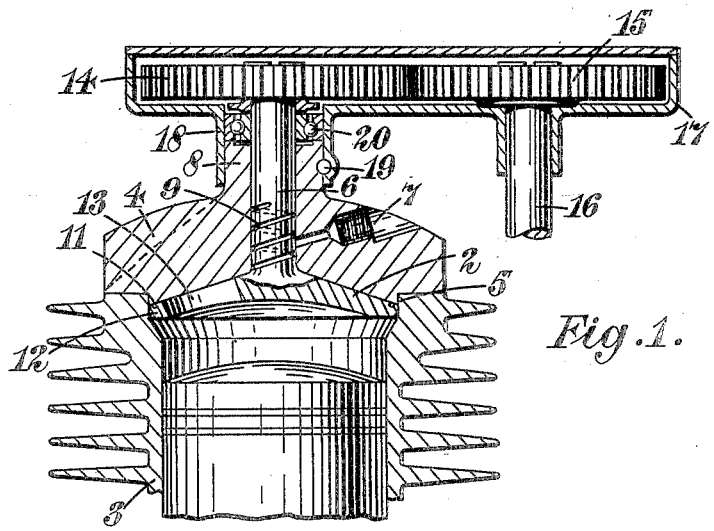
Figure 2:
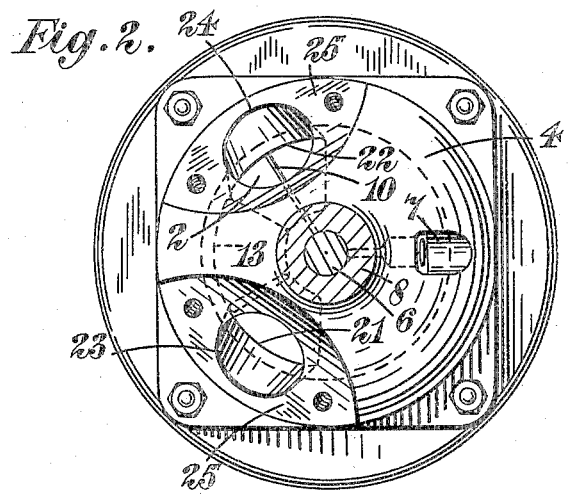
Figures 3, 4:
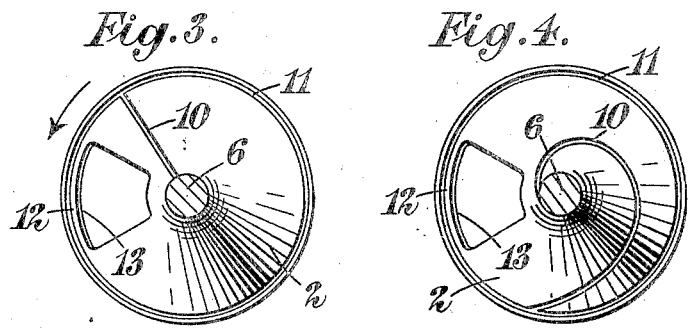

In the accompanying drawings, which illustrate various methods of carrying out the invention, Figure 1 is an axial section of part of an engine cylinder having a detachable head carrying a coaxially mounted valve with its associated driving gear, Figure 2 is a plan of Figure 1 with the driving gear and its surrounding casing omitted, Figure 3 is a plan of the valve showing its working face and one form of distributing channel, Figure 4 is a view similar to Figure 3 showing an alternative form of distributing channel, Figure 5 is an axial section of part of a cylinder having a detachable head and a valve therein whose axis is inclined to that of the cylinder, Figure 6 is a similar section of a cylinder having an integrally formed head and coaxially mounted valve therein, Figures 7 and 8 are respectively a section and a plan from below of a cylinder having a detachable head and four rotary valves mounted therein, Figure 9 is a plan of the outer face of a valve which is dynamically balanced, and Figure 10 is an axial section of a valve in which a sparking plug is combined with the driving stem.

Like numerals indicate like parts throughout the drawings.

In the method of carrying out the invention as illustrated in Figures 1–3, for use in an internal combustion engine, the valve 2 is of conical form and the apex angle of the cone is sufficiently great to prevent any risk of jamming. Thus a preferred angle would be between 120 and 160 degrees.

In this construction, the valve is arranged coaxially with the cylinder 3 in a detachable head 4 which spigots into the cylinder at 5. The periphery of the valve has clearance from the walls of the recess provided for the spigot in the head, and the overall diameter of the valve is greater than the bore of the cylinder, so that the valve could not possibly drop therein.

This permits of allowing a certain limited amount of axial float, for example, four thousandths of an inch, more or less, thereby avoiding any risk of binding of the valve under expansion effects, whilst relying on the internal pressure to hold the valve to its seat. This float is not sufficient, however, to cause leakage during the suction stroke, particularly in view of the effective lubrication provided by this invention. Also its existence renders it safe to omit springs or other devices adapted to hold the valve against its seating face in the cylinder head.

Lubricant is supplied to the valve stem 6 through a radially arranged hole 7 located in a central hollow boss 8 provided on the head 4 to receive the stem, along which it passes to the face of the valve. Preferably, however, a helical groove 9 which may have a section similar to a buttress thread is provided in the valve stem and serves as a screw pump conveying the lubricant from the radial hole 7 to the junction of the stem with the head of the valve. In the face of the latter is provided a channel 10 (see Figures 2 and 3) adapted to convey the lubricant fed down the stem to the outer edge of the valve and at the same time to provide for its distribution over the face thereof as the valve rotates, eventually leading it to a circumferential groove 11 provided in the face of the valve near the edge so as to lie in the part 12 beyond the outer edge of the sector shaped port 13 formed in the valve. The lubricant, in flowing from the inner to the outer edge of the valve is effectively distributed over the working faces so that there is no risk of seizure, whilst friction is very considerably reduced.

As centrifugal force assists in the flow of the lubricant radially outwards it may be desirable to incline the channel 10 tangentially to the stem, or spirally across the valve as is shown in Figure 4, so that the effect can be adjusted to suit the diameter of the valve and its normal rotational speed, thereby avoiding wastage of lubricant. The direction of tangential or spiral inclination of the channel in relation to the direction of rotation can be such as considerably to reduce the centrifugal effect.

As a further modification of the lubricant channel in the valve, when the latter is relatively of considerable size or has a high peripheral speed, the channel might have a zig-zag path.

For the driving of the valve, a spur wheel 14 may be mounted upon the stem 6 and be connected with a spur wheel 15 on a vertical shaft 16 driven from the engine shaft by spiral or bevel gears. The spur wheels may be enclosed in a casing 17 having a depending socket 18 adapted to engage with the hollow boss 8 in which the valve stem is mounted, and it can be made angularly fast by means of a feather or a pinching screw or the cotter 19. Also, a ball bearing 20 may be provided below the spur wheel 14, and the outer race of this may be mounted wholly in the socket 18, or it may be held only partly therein, and partly in the boss 8 which supports the valve stem.

In one arrangement of the inlet and exhaust ports 21 and 22 provided in the valve seating the exhaust port is included in a sector of 70°, the inlet port in a sector of 46°, and the bridge between them in a sector of 50°. The port 13 formed in the valve would be within a sector of 55°. This arrangement provides a certain amount of "overlap" in the opening and closing of the two ports, which is suitable for high speeds, but for lower speeds the angular width of the bridge sector may be increased. The foregoing proportions ensure a desired amount of "dwell" both during suction and exhaust.

By a preferred modification as illustrated in Figure 2, the angles of the fixed and moving ports are alike, for example sixty degrees, but provision is made for "overlap", if desired.

It will be seen from the foregoing that active lubrication of the valve stops and starts with the engine, and in fact the valve is adapted to form its own positive lubricating device. This avoids the greatest difficulty which is commonly experienced with rotary valves, and in practice it ensures in and after prolonged hard running, relative coolness of the valve and produces on its working face a highly polished surface which minimizes friction.

The outer ends 23 and 24 of the inlet and outlet ports 21 and 22 may be circular and extend into bosses having flat faces 25 against which flanges on the induction and exhaust conduits can be secured. For a multi-cylinder engine, the outer ends of the inlet and exhaust ports may extend in the same general horizontal direction, or, taking the cylinders in pairs, the respective inlet and exhaust ports can be connected to one another before being connected to the manifold.

Where the channel 10 in the valve face extends as in Figure 3 substantially radially from the stem of the valve to the circumferential channel 11, it is preferably located so that in the rotational sense as indicated by the arrow, it follows behind the port 13 in the valve.

As an alternative to forming the lubricant passages in the valve itself, they may be in the stationary surfaces co-acting with the valve, or partly in each. Thus, for example, the helical groove 9 by which the lubricant is conveyed along the valve stem may be formed in the wall of the central hollow boss 8 or other guide hole or bush receiving the stem as in Figure 5, and the radial distributing channel 10 connecting with the helical groove may extend across the valve seating either in the latter or in the valve, whilst the circumferential channel 11 may be in the seating as in Figure 6.

If desired, the valve head and stem may be separately formed and also may be of dissimilar materials adapted to suit the conditions to which they are subjected.

Although in many cases it is preferable to form the cylinder head separately as in Figures 1, 2 and 5 and in so doing to provide a counterbore as at 5 in the cylinder, the shoulder of which may limit the axial float of the valve and also constitute a safety lip adapted to prevent the valve dropping into the cylinder bore, it may in some cases be desirable to form the head integrally with the cylinder as in Figure 6. Under these circumstances it is necessary to insert the valve from the mouth of the cylinder, and consequently its diameter must be slightly less than the cylinder bore to enable it to be put into place. A combined float limiting device and safety lip can then be provided by first forming a circumferential groove 26 around the interior of the cylinder head between the valve and the piston when the latter is in its uppermost position, and thereafter engaging with this groove a split spring ring 27 which expands outwardly, firmly engaging the groove and projecting from it sufficiently to provide the lip. The spring ring may be constituted by an ordinary piston packing ring. The float limiting device may be provided at the upper end of the valve stem by arranging suitable clearance between the gear 14 and the inner race of the ball bearing, and so be separate from the safety lip.

Although in engines of comparatively small size it may be desirable to arrange the valve with its rotational axis coincident with the cylinder axis as in Figures 1 and 2, this is not always essential and in some cases it may be preferred to arrange the valve with its axis inclined to that of the cylinder as in Figure 5. In engines of comparatively large dimensions it may also be desirable to employ two or more valves and to space them around the cylinder with their axes either inclined to the cylinder axis or parallel thereto as in Figures 7 and 8. In either arrangement, however, it is preferred to provide a float-limiting device and also a safety lip or the like adapted to prevent the valve head falling into the cylinder should it become detached from its stem. In the case of several valves spaced around the centre of the cylinder, the shoulder of the counterbore 5 around the latter is adapted to support only one side of the valve head should it drop or become detached, and there may therefore be a detachable plug 28 screwed into the end centre of the cylinder and having a shoulder adapted to co-operate with the lip on the cylinder wall to support any or all of the valves in case of fracture.

To avoid vibrations set up at high rotational speeds of the valve, it is preferred to balance the latter dynamically, and this may be effected by providing additional metal in the region around the port in the valve, or by reducing the amount on the opposite side of the valve, as, for example, by recessing it at 29 Figure 9 on its outer face.

Under certain circumstances, and particularly in the present invention whereby the valve surfaces are exceptionally well lubricated, it is highly desirable that the ignition point should be central in the crown of the cylinder both for reasons of efficiency and to be remote from the lubricant, and to attain this result when the valve is centrally mounted, the ordinary sparking plug uncovered by the port or located in the side of the cylinder could be omitted and the stem of the valve could be of such diameter that it could be made hollow and have located in it an insulated electrode 30 (see Figure 10). The inner end 31 of this electrode would co-operate with the metal of the valve to provide the spark gap, and the outer end 32 could be connected to the electrical circuit through a spring blade (not shown) or the like pressing against it.

What I claim as my invention and desire to secure by Letters Patent of the United States is:—

1. In a rotary valve for a fluid pressure engine, the combination of a revolving ported disc constituting the valve, a stem carrying said disc, a guide for said stem provided with a port for the supply of lubricant, a seating for said valve in the dome of the engine cylinder, inlet and exhaust ports in said seating, a lubricant containing channel between said valve stem and said guide supplied through said port, and a complete circumferential lubricant distributing channel on the edge between the face of said valve and its seating, close to the periphery of the valve and connected to the beforementioned lubricant containing channel, whereby the lubricant is led from the lubricant containing channel to the complete circumferential groove at the periphery of the valve.

2. A rotary valve as claimed in claim 1 in which the valve is retained upon its seating solely by the pressure acting upon it, which pressure is entirely taken by the stationary valve face.

In testimony whereof I have signed my name to this specification.

WILLIAM HOWELL PEACEY.